United States Patent
King

(10) Patent No.: US 9,167,160 B2
(45) Date of Patent: Oct. 20, 2015

(54) IMAGE CAPTURE STABILIZATION

(71) Applicant: Karl Storz Imaging, Inc., Goleta, CA (US)

(72) Inventor: Timothy King, Goleta, CA (US)

(73) Assignee: Karl Storz Imaging, Inc., Goleta, CA (US)

( * ) Notice: Subject to any disclaimer, the term of this patent is extended or adjusted under 35 U.S.C. 154(b) by 324 days.

(21) Appl. No.: 13/676,956

(22) Filed: Nov. 14, 2012

(65) Prior Publication Data

US 2014/0132746 A1  May 15, 2014

(51) Int. Cl.
H04N 9/47 (2006.01)
A62B 1/04 (2006.01)
H04N 5/232 (2006.01)
H04N 1/21 (2006.01)
H04N 5/225 (2006.01)

(52) U.S. Cl.
CPC ........... H04N 5/23248 (2013.01); H04N 1/215 (2013.01); *H04N 2005/2255* (2013.01)

(58) Field of Classification Search
USPC ................ 348/65, 51, 50, 46, 45, 24, 208.6, 348/208.2, 208.99, 207.11, 211.9, 211.14, 348/220.1, 222.1, 231.2, 231.5, 231.99, 348/333.11, 333.12, 419.1, 714, 719
See application file for complete search history.

(56) References Cited

U.S. PATENT DOCUMENTS

| | | | |
|---|---|---|---|
| 5,740,801 A | 4/1998 | Branson | |
| 7,161,619 B1 * | 1/2007 | Niida et al. | 348/207.11 |
| 7,253,836 B1 * | 8/2007 | Suzuki et al. | 348/234 |
| 8,199,188 B2 | 6/2012 | Amling et al. | |
| 8,199,220 B2 * | 6/2012 | Srikanth et al. | 348/231.99 |
| 2002/0135685 A1 * | 9/2002 | Tsunoda | 348/231.2 |
| 2003/0052859 A1 * | 3/2003 | Finley | 345/156 |
| 2004/0133072 A1 | 7/2004 | Kennedy | |
| 2005/0018073 A1 * | 1/2005 | Pilu | 348/375 |
| 2005/0212922 A1 * | 9/2005 | Watanabe | 348/220.1 |
| 2005/0212930 A1 * | 9/2005 | Sim et al. | 348/231.4 |
| 2005/0237568 A1 * | 10/2005 | Yun | 358/1.15 |
| 2006/0034600 A1 | 2/2006 | Wang | |
| 2006/0227999 A1 * | 10/2006 | Taylor | 382/103 |
| 2007/0083098 A1 * | 4/2007 | Stern et al. | 600/407 |
| 2007/0177010 A1 | 8/2007 | Murata | |
| 2007/0223797 A1 | 9/2007 | Kaneko | |
| 2008/0091065 A1 | 4/2008 | Oshima et al. | |
| 2008/0151041 A1 * | 6/2008 | Shafer et al. | 348/45 |
| 2009/0118578 A1 | 5/2009 | Takasugi et al. | |
| 2009/0141147 A1 * | 6/2009 | Alberts et al. | 348/240.99 |
| 2010/0033592 A1 * | 2/2010 | Oyama | 348/222.1 |
| 2010/0231735 A1 * | 9/2010 | Burian et al. | 348/220.1 |
| 2011/0221916 A1 * | 9/2011 | Kuriyama | 348/220.1 |
| 2011/0222843 A1 * | 9/2011 | Al et al. | 396/469 |
| 2012/0249741 A1 * | 10/2012 | Maciocci et al. | 348/46 |

OTHER PUBLICATIONS

Olympus America Inc—Evis Exera III, Advancing the Art of Endoscopy, 2012, 8 pages.

* cited by examiner

*Primary Examiner* — Jeffeey Harold
*Assistant Examiner* — Mustafizur Rahman
(74) *Attorney, Agent, or Firm* — Whitmyer IP Group LLC

(57) ABSTRACT

An endoscopic video system with still image capture stabilization, including a processor, an image capture device capturing a plurality of still images at a time interval, an image buffer temporarily storing a portion of the still images, and software executing on the processor for retrieving, upon receiving an image capture instruction, a first one of the still images from the image buffer, the first one of the still images representative of a still image captured a first length of time prior to the image capture instruction.

20 Claims, 5 Drawing Sheets

IMAGE CAPTURE STABILIZATION

FIELD OF THE INVENTION

The invention relates to stabilizing still images during capture, and more specifically to a system and method for stabilizing still images using a buffer for automatically storing multiple still images.

BACKGROUND OF THE INVENTION

Endoscopes are well known and widely used in the medical field. In general terms, endoscopes can be characterized as either rigid or flexible. Typically, rigid endoscopes comprise an elongated shaft housing an optical system which conveys light rays from the distal end of the shaft to an ocular positioned at the proximal end of the shaft. At times, medical practitioners directly view the inside of a body cavity via the endoscope ocular. Primarily, however, a hand-held, ruggedized camera is detachably affixed to the endoscope ocular to ultimately present images representative of the endoscope field of view on a surgical display/monitor.

Typically, the camera (also known as a camera head) includes a solid-state image sensor which converts detected light rays into electronic signals representative of the endoscope field of view. Additionally, some rigid endoscopes have integrated imagers which obviate the need for a separate camera head. Endoscopes with integrated imagers (both rigid and flexible) are known in the field as video endoscopes. Video endoscopes, as with detachable camera heads, are typically either wired or wirelessly in communication with a camera control unit ("CCU"). CCU's receive, from the camera head or video endoscope, the electronic signals representative of the endoscope field of view.

Video systems used with endoscopes generally provide the capability to view live images representative of an endoscope distal tip field of view while the endoscope shaft is inserted into the patient. Some video systems used with endoscopes also provide capability for the user to capture and store still images, as well as record moving images, i.e., video, of the viewing field. To do so, such video systems generally have an image capture button that is pressed by the surgeon in order to capture a still image or to start/stop recording video. Typically, the image capture button is located on the camera head or the video endoscope itself to be directly under the practitioner's control within the operative sterile field.

For example, U.S. Patent Application Publication No. 2007/0177010 describes an endoscope having a freeze recording button that captures and records a still image at the instant the button is pressed. U.S. Pat. No. 5,740,801 describes an endoscopy system including a still frame buffer that temporarily stores an image obtained by an image input device when a freeze command is received.

A problem with conventional still image capture techniques is that the action of pressing the image capture button, located either on a camera head or video endoscope, tends to cause the endoscope and camera head to move, thus distorting the still image. Even the slightest lateral movement of the endoscope/camera head can typically translate into a substantial corresponding movement of the distal tip of the endoscope, which can induce significant captured still image blur and distortion. Typically, flexible endoscopes do not suffer from captured still image blurring or distortion due to lateral endoscope/camera head movement, because due to the flexible shaft the lateral movements are not transferred to the distal tip of the endoscope. However, longitudinal movement of the endoscope/camera can also induce still image blur or distortion during capture. If, while striking the still image capture button, the practitioner also pulls the endoscope/camera head in a proximal direction, the distal tip of the endoscope may correspondingly move proximally thus inducing blur or distortion. In addition to captured still image blur or distortion caused by endoscope/camera head movement, there is inevitably a delay between the time that a user decides to capture a still image, and the actual time at which the image capture function is executed. Thus, the still image captured may not include what the user intended when the decision was made to capture the still image.

Thus, it is desired to provide an improved image capture method and system which overcomes these problems.

SUMMARY OF THE INVENTION

Accordingly, it is an object of the present invention to provide a system and method for still image capture stabilization using an image buffer which stores images prior to receiving an image capture request.

It is a further object of the present invention to provide such a system and method in which a still image is selected from the buffer for capture and/or storage by selecting an image taken a fixed time before the image capture request is initiated.

These and other objectives are achieved by providing a video system with still image capture stabilization, including a processor, a camera capturing a plurality of still images at a time interval, an image buffer temporarily storing a portion of the still images, and software executing on the processor for retrieving, upon receiving an image capture instruction, a first one of the still images from the image buffer, the first one of the still images representative of a still image captured a first length of time prior to the image capture instruction. The first length of time may be, for example, 100 milliseconds.

In some embodiments, the system includes software executing on the processor for storing the first one of the images. The system may also include an endoscope including an image sensor and an image capture button, wherein the image capture instruction is initiated by the image capture button.

Other objectives are achieved by providing a video system with still image capture stabilization, including an image capture device including an image sensor, an image buffer storage, software executing on a processor for receiving a plurality of still images from the image capture device and storing the plurality of still images in the image buffer, and software executing on the processor for selecting one of the plurality of still images upon receipt of an image capture request, the selected one of the plurality of still images captured a first time before the receipt of the image capture request.

In some embodiments, the system further includes a camera head comprising an image sensor and image capture button, wherein the image capture request is initiated by the image capture button. The camera head further includes an image store button, wherein the system stores the selected one of the plurality of the still images in response to actuation of the image store button.

Further provided is a method for capturing still images, including the steps of capturing a plurality of still images with an image sensor, storing, via software executing on a camera control unit, a portion of the still images captured over a preceding period of time in an image buffer, and retrieving, upon receiving an image capture instruction, a first one of the images from the image buffer, the first one of the images representative of an image captured at a first time duration prior to the image capture instruction. In some embodiments, the first time duration is at least 100 milliseconds.

Other objects of the invention and its particular features and advantages will become more apparent from consideration of the following drawings and accompanying detailed description.

DETAILED DESCRIPTION OF THE INVENTION

Figure 1:
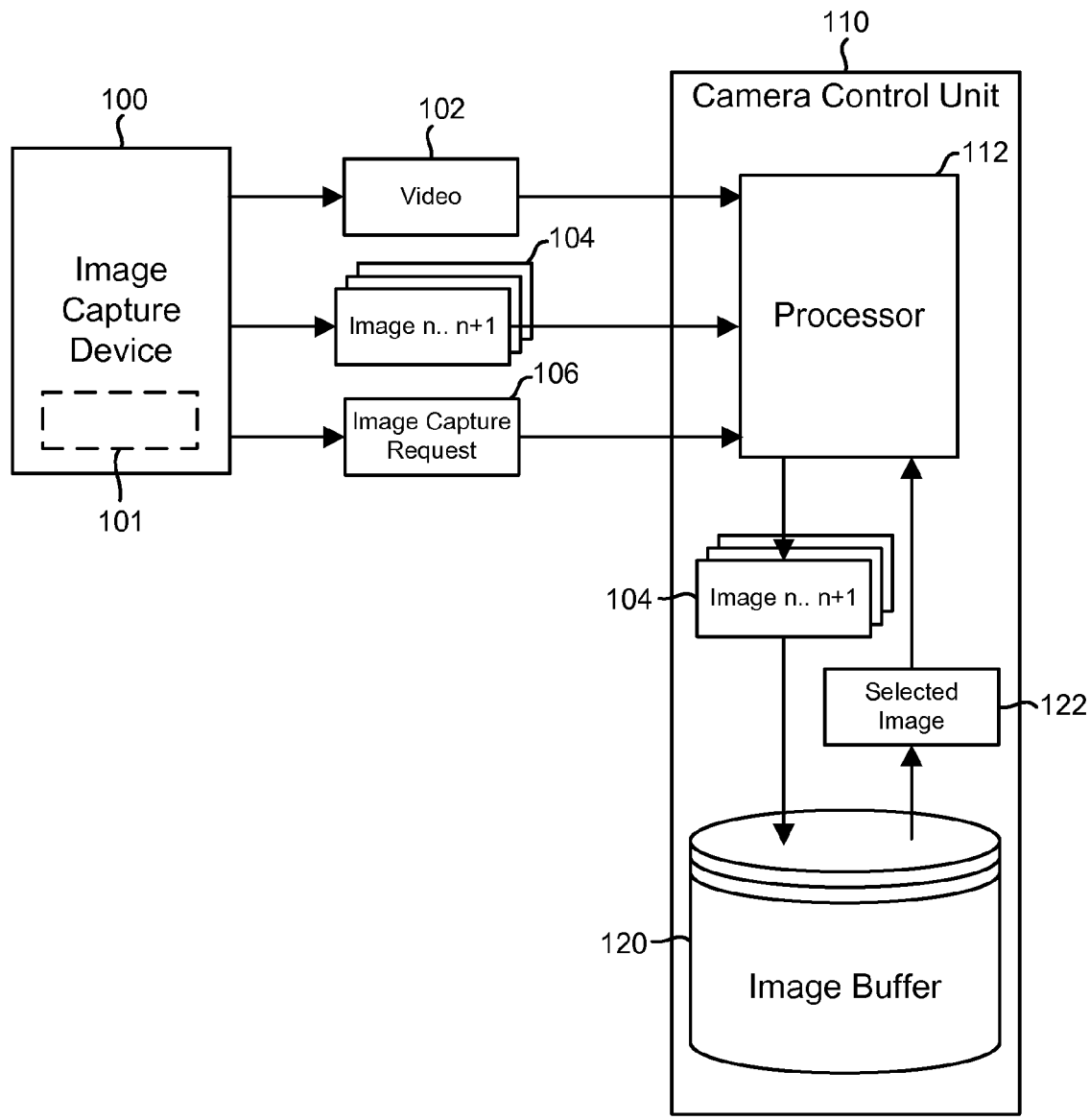
FIG. 1 illustrates a system according to an exemplary embodiment of the present invention.

FIG. 1 shows a system according to an exemplary embodiment of the present invention. The system includes an image capture device 100 including at least one image sensor 101 capable of detecting light rays. In some embodiments, the image capture device 100 includes a 1080p high definition image sensor. The image capture device 100 may be a stand-alone camera head, or may be housed in an endoscope. The image capture device 100 may be a single unit or may be comprised of several distributed components (e.g., in the endoscope).

The system further comprises a camera control unit 110 ("CCU") including at least one processor 112 (e.g., a microprocessor) and at least one image buffer 120 memory location or device. The image buffer 120 may be comprised in random access memory (RAM) within the CCU 110. In some embodiments, however, the image buffer 120 is external to the CCU 110. For example, the image buffer 120 may be located remote to the CCU 110 and in communication with the CCU 110 via a network. The network may be, for example, a computer network or intranet within a hospital, or the internet.

The image capture device 100 provides continuous video imagery 102 to the CCU 110 while the system is in use. For example, video imagery 102 of a surgery, as viewed via the distal end of an endoscope, may be provided. The video 102 may be presented live on one or more displays, such as monitors or displays in an operating room environment (not shown). The video 102 may also be stored in a hard drive associated with the CCU 110 or remote thereto.

In some embodiments, the video is provided at sixty (60) frames per second. In other embodiments, the video is provided at twenty-four (24), twenty-five (25), thirty (30), fifty (50), one hundred (100), or one hundred and twenty (120) frames per second. In still other embodiments, the video is provided at a frame rate of 120/1.001, 60/1.001, 30/1.001, or 24/1.001.

The image capture device 100 provides data indicative of still images 104 to the camera control unit 110. In a preferred embodiment, still images 104 are continuously captured and stored in the image buffer 120. For example, still images of a surgical procedure may be captured via the distal end of an endoscope to document various portions of the surgery. The interval or rate of capture for the still images 104 may vary among different embodiments of the system. In some embodiments, several different intervals are available and the interval may be selectively chosen by a user (e.g., in system settings).

The image buffer 120 stores still images 104 for a predetermined period of time, and then it deletes or overwrites the oldest images. For example, the image buffer 120 may continuously store images captured over the last one (1) second. Images older than one (1) second are deleted over overwritten. In some embodiments, images are retained in the image buffer for a longer period of time (e.g., 10 seconds, 30 seconds, 1 minute, or more).

The interval may be a function of the video image interval or frame rate. For example, with a sixty (60) frames per second image capture device 100, a still image 104 may be captured every sixth of a second, tenth of a second, or hundredth of a second. These intervals are exemplary only and different embodiments of the system may permit different intervals. User settings may also enable the user to select any desired interval or function (e.g., interval or percentage) of the frames per second in which to capture still images.

In some embodiments, still images 104 may be captured via the image capture device 100 and transmitted, independent of the video 102, to the camera control unit 110. However, in a preferred embodiment, the still images 104 comprise frames which are extracted from the video frames. For example, the image capture device 100 may provide continuous video 102 to the camera control unit 110 and software executing on the processor 112 extracts still image frames 104 according to the selected or default interval.

When a user, such as a surgeon, desires to capture a still image, the user causes the image capture device 100 to send an image capture request 106, e.g., by pressing an image capture button associated with the image capture device 100 or by other means. Upon doing so, image selection software executing on the processor 112 selects a still image 122 from the image buffer 120.

The selected still image 122, or a preview thereof, may be displayed to the user, stored, and/or printed. For example, the still image 122 may be displayed on a monitor for review by the user and selectably stored upon a request (e.g., second press of the same or different button initiating selected still image storage). The still image 122 may also be automatically stored with or without a preview (e.g., based on user settings). Prior to storage, software executing on the processor may compress and/or resize the still image 122 (e.g., into a JPEG image, or the like). Such software may also embed metadata in the still image 122, such as patient information.

In a preferred embodiment, the software selects an image 122 that was captured a fixed time before the image capture button was pressed. By doing so, the selected image is unaffected by any movement of the endoscope cased by the action of pressing the button. Moreover, the selected image may more accurately reflect the image desired by the user at the time the decision was made to store an image, e.g., at the time between initial framing of the image and striking of the image capture button. For example, the software may automatically select the image from the buffer 120 that was captured one hundred (100) milliseconds (ms) prior to the image capture request 106. The fixed time may vary among different embodiments of the system and may also be selected by a user in system settings. For example, the fixed time may be less 100 ms. The fixed time may also be more than 100 ms, such as 200 ms, 300 ms, 400 ms, 500 ms, or more.

In other embodiments, software for selecting an image selects a prior image based on a quality of the images, such as sharpness, color, or movement. For example, the system may evaluate sharpness of a plurality of images in the buffer 120 by evaluating an image histogram of one or more pixels in each image. The system may create and evaluate an image histogram associated with a plurality of pixels in a particular area of each image, or create and evaluate an image histogram across the entire image. The image with the best sharpness, color, or other predetermined quality may be the selected image 122. Software executing on the processor 112 may also analyze some or all of the frames around the time of the image capture request to determine which frame to pick based on the motion vectors, the focus and/or the combination of the motion vectors and the focus of the images in each frame.

Figure 2:
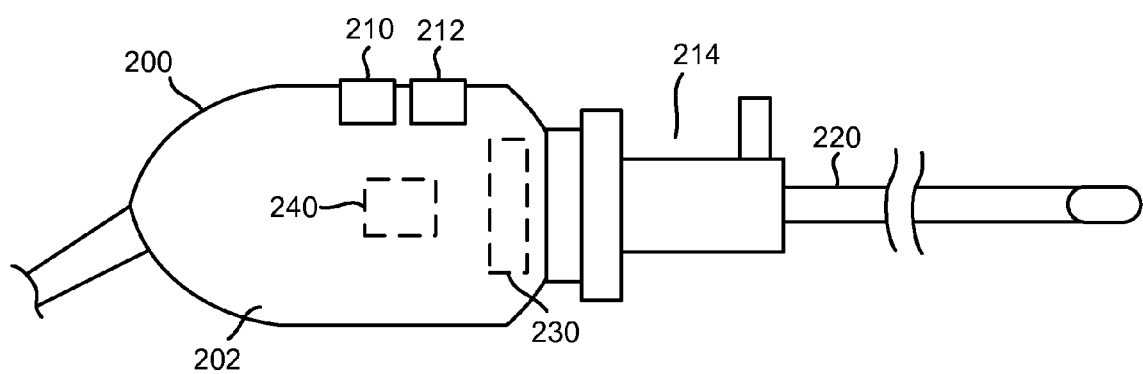
FIG. 2 illustrates a camera head and endoscope of the system shown in FIG. 1.

FIG. 2 illustrates a camera head 200 and endoscope of the system shown in FIG. 1. The camera head 200 includes a housing 202 having at least one button. In the present embodiment, the camera head 200 includes two buttons 210, 212. At least one of the buttons is an image capture button. In some embodiments, at least one of the buttons is an image store button. For example, the still image may be displayed to the user on a monitor after pressing the image capture button (e.g., 210) and optionally stored after the user presses the image store button (e.g., 210 or 212). The camera head 200 is connected to an endoscope ocular 214. The endoscope shaft 220 may be flexible or rigid.

The camera head 200 includes an image capture device 230 within the housing 202. The image capture device 230 may comprise a CCD or CMOS image sensor, one or more lenses, and/or any additional hardware known to those of skill in the art to capture still images via the distal end of the endoscope shaft 220. Data from the image capture device 230 is sent to the CCU 110 for processing and storage.

In some embodiments, the camera head 200 includes at least one accelerometer 240 within the housing 202. The accelerometer 240 may be a one, two, or three axis accelerometer. The accelerometer 240 may provide data indicative of the amount of movement of the camera head 200 at a given time when a still image is stored in the image buffer 120. Such accelerometer data is associated with the still image in the image buffer 120 or other storage. For example, accelerometer data may be embedded in the metadata of each image temporarily stored in the image buffer. As such, in some embodiments, when the still image is selected, software executing on the processor accesses the accelerometer data stored with the still images and determines which still image in the buffer was captured at the time of least movement.

Figure 3:
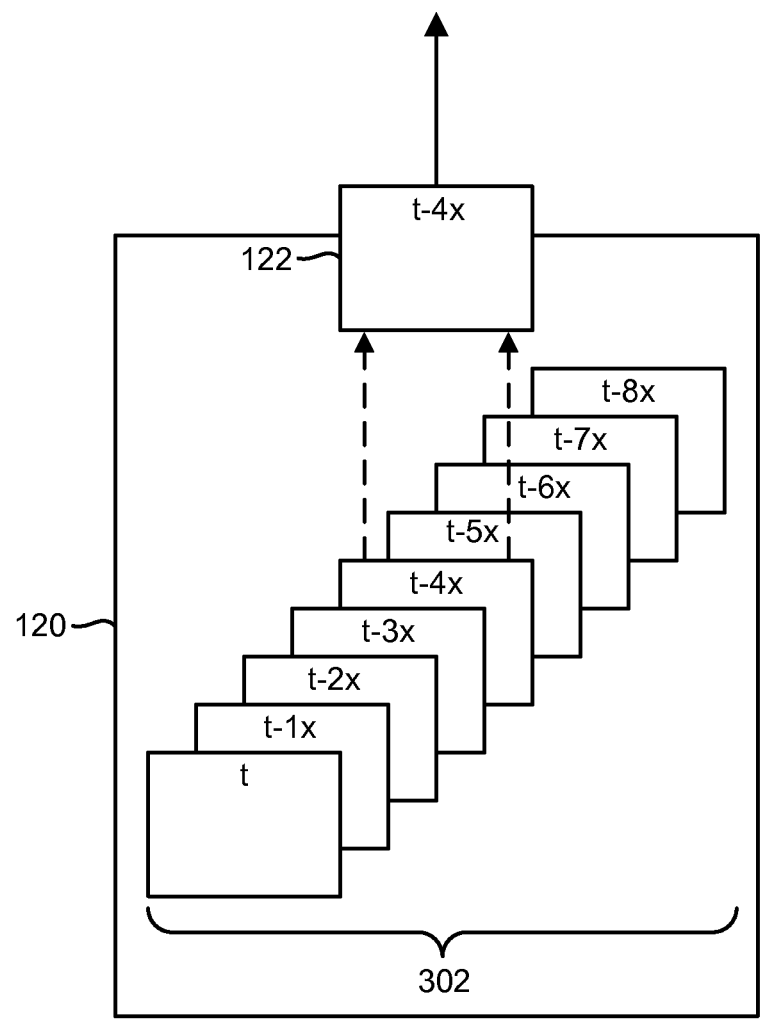
FIG. 3 illustrates an image buffer of the system shown in FIG. 1.

FIG. 3 illustrates the image buffer 120 of the system shown in FIG. 1. The image buffer 120 may be comprised in random access memory (RAM) within the CCU 110. In some embodiments, however, the image buffer 120 may be external to the CCU 110. In some embodiments, the image buffer 120 is located remote to the CCU 110 and in communication with the CCU 110 via a network. As shown in FIG. 3, the image buffer 120 stores a series of images 302 at a plurality of times or time slots. For example, the image buffer 120 may store an image at the present time (t) and a plurality of images at a fixed interval (x) prior to the present time (t). Upon receiving an image capture request 106, at least one of the images 302 is selected and presented to the user on a display, stored, and/or printed to a local or remote printer.

Figure 4:
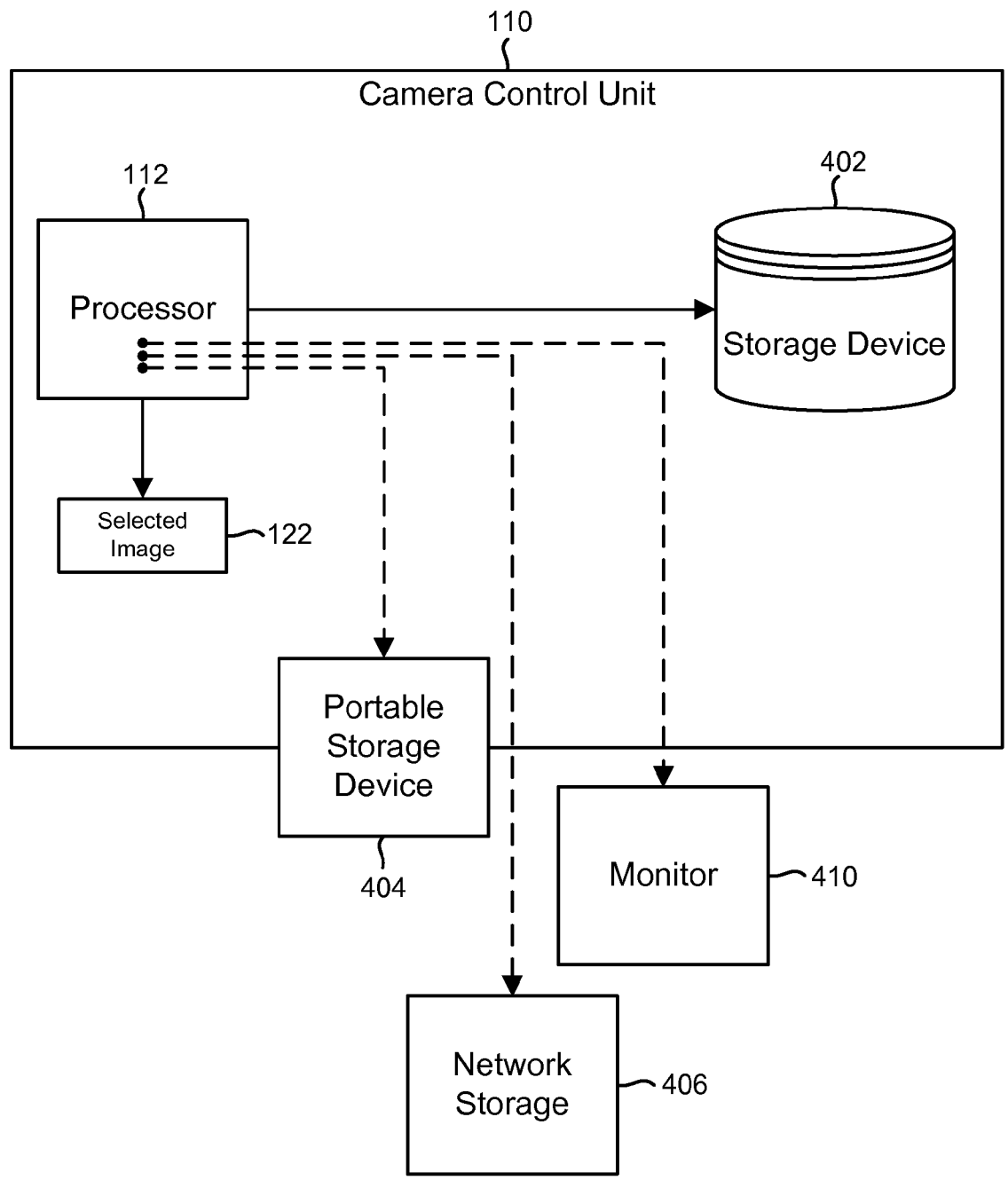
FIG. 4 illustrates a camera control unit of the system shown in FIG. 1.

As shown in FIG. 4, a selected image 122 may be stored locally within the CCU 110 in a storage device 402. In some embodiments, the selected image 122 is storage on portable storage device 404 (e.g., USB or thumb storage device) that is removably connected to the CCU 110. For example, the CCU 110 may have one or more ports for receiving portable storage devices as disclosed in U.S. Pat. No. 8,199,188, the contents of which are incorporated herein by reference. In some embodiments, the selected image 122 may also be send to a network storage device 406. As discussed above, the selected image 122 may also be sent to a monitor 410.

Figure 5:
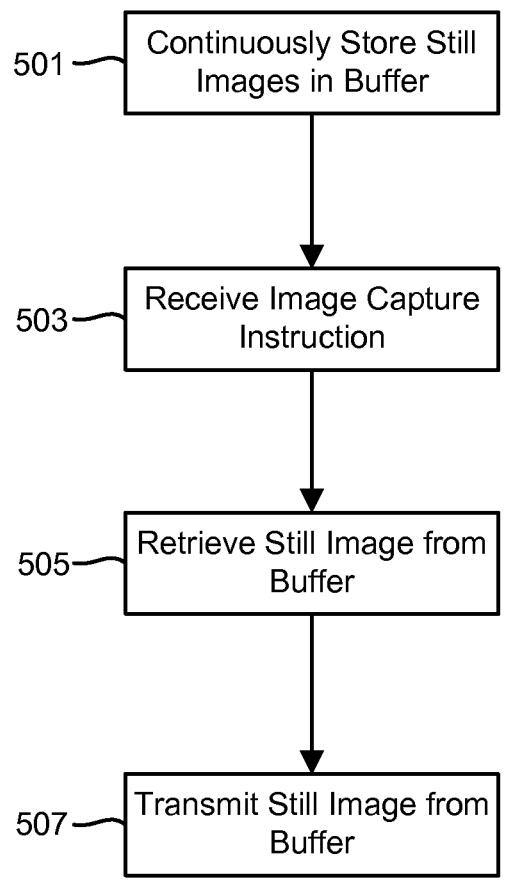
FIG. 5 illustrates a method for stabilizing still images according to an exemplary embodiment of the present invention.

FIG. 5 illustrates a method for stabilizing still images according to an exemplary embodiment of the present invention. The method includes the step of continuously storing still images in a buffer (501) and receiving an image capture instruction (503). After receiving the image capture instruction, a still image is retrieved from the buffer (505). For example, an image captured 100 ms before the image capture instruction may be selected and retrieved. The selected still image, or a copy thereof, is then transmitted or transferred from the buffer (507). The selected still image may be transferred to a storage device for permanent or semi-permanent storage. The selected still image may also be displayed to the user, e.g., on a monitor in the operating room, and/or printed.

Although the invention has been described with reference to a particular arrangement of parts, features and the like, these are not intended to exhaust all possible arrangements or features, and indeed many modifications and variations will be ascertainable to those of skill in the art.

What is claimed is:

1. A video system with still image capture stabilization, comprising:
 a processor;
 an image capture device capturing a plurality of still images at a time interval;
 an image buffer temporarily storing a portion of the still images; and
 software executing on said processor for retrieving, upon receiving an image capture instruction, a first one of the still images from said image buffer, the first one of the still images representative of a still image captured a selected first length of time prior to the image capture instruction.

2. The system of claim 1, further comprising software executing on said processor for storing the first one of the still images.

3. The system of claim 1, further comprising software executing on said processor for displaying the first one of the still images.

4. The system of claim 1, wherein the first length of time is at least 100 milliseconds.

5. The system of claim 1, further comprising software executing on said processor for deleting the portion of the still images stored on said image buffer after a predetermined amount of time.

6. The system of claim 1, further comprising an endoscope, wherein the endoscope comprises said image capture device.

7. A video system with still image capture stabilization, comprising:
 a processor;
 an image capture device capturing a plurality of still images at a time interval;
 an endoscope, wherein the endoscope comprises said image capture device;
 an image buffer temporarily storing a portion of the still images;
 software executing on said processor for retrieving, upon receiving an image capture instruction, a first one of the still images from said image buffer, the first one of the still images representative of a still image captured a first length of time prior to the image capture instruction; and
 an accelerometer providing data indicative of movement of the endoscope at each time one of the plurality of still images is stored in the image buffer.

8. The system of claim 6, wherein the endoscope includes an image capture button, wherein the image capture instruction is initiated by user actuation of the image capture button.

9. The system of claim 1, further comprising a camera control unit comprising said processor and said image buffer.

10. The system of claim 9, further comprising a storage device removably connected to the camera control unit, wherein the first one of the still images is stored on the storage device.

11. An endoscope system with still image capture stabilization, comprising:
   an image capture device;
   an image buffer storage;
   software executing on a processor for receiving a plurality of still images from said image capture device and storing the plurality of still images in said image buffer; and
   software executing on the processor for selecting one of the plurality of still images upon receipt of an image capture request, the selected one of the plurality of still images captured a selected first time before the receipt of the image capture request.

12. The system of claim 11, wherein the first time is at least 100 milliseconds.

13. The system of claim 11, further comprising a camera head including an image capture button, wherein the image capture request is initiated by user actuation of the image capture button.

14. The system of claim 13, wherein the camera head further includes an image store button, wherein the system stores the selected one of the plurality of the still images in response to actuation of the image store button.

15. The system of claim 11, further comprising an endoscope, wherein the endoscope comprises said image capture device.

16. A method for capturing still images, comprising the steps of:
   capturing a plurality of still images via an image capture device;
   storing, via software executing on a camera control unit, a portion of the still images captured over a preceding period of time in an image buffer; and
   retrieving, upon receiving an image capture instruction, a first one of the images from the image buffer, the first one of the images representative of an image captured a selected first time duration prior to the image capture instruction.

17. The method of claim 16, wherein the first time duration is at least 100 milliseconds.

18. The method of claim 16, further comprising the step of storing the first one of the images on a storage device.

19. The method of claim 18, wherein the storage device is removably connected to the camera control unit.

20. The method of claim 18, wherein the step of storing the first one of the images includes receiving an image store request from a user.

* * * * *